United States Patent [19]

Lunder et al.

[11] Patent Number: 4,680,193

[45] Date of Patent: Jul. 14, 1987

[54] SOLUBILIZATION OF TEA IN COLD WATER WITH CATECHIN

[75] Inventors: Tito-Livio Lunder, Lausanne; Birgit Hoffmann, Vandoeuvres; Corine-Madeleine Nielsen, Lausanne, all of Switzerland

[73] Assignee: Nestec S.A., Vevey, Switzerland

[21] Appl. No.: 848,442

[22] Filed: Apr. 4, 1986

Related U.S. Application Data

[63] Continuation-in-part of Ser. No. 788,470, Oct. 17, 1985, abandoned, which is a continuation-in-part of Ser. No. 732,167, May 8, 1985, abandoned.

[51] Int. Cl.⁴ .................................................. A23F 3/16
[52] U.S. Cl. ..................................... 426/597; 426/271
[58] Field of Search ................................ 426/597, 271

[56] References Cited

U.S. PATENT DOCUMENTS 2,863,775  12/1958  Perech ........................... 426/597 X
3,445,236   5/1969  Gurkin ........................... 426/597 X
4,357,361  11/1982  Lunder et al. ...................... 426/597

FOREIGN PATENT DOCUMENTS 2268518  11/1975  France .
     708  of 1861  United Kingdom ............... 426/597
0854353   8/1981  U.S.S.R. ............................. 426/597
0856424   8/1981  U.S.S.R. ............................. 426/597
1102554   7/1984  U.S.S.R. ............................. 426/597

Primary Examiner—Joseph Golian
Attorney, Agent, or Firm—Vogt & O'Donnell

[57] ABSTRACT

A process for the production of a cold-water soluble instant tea which comprises extracting black tea leaves with hot water, concentrating and cooling the hot-water extract of black tea leaves to precipitate substantially all the tea cream characterized in that the concentrated, cooled extract of black tea leaves is treated with an appropriate quantity of a catechin or mixture of catechins capable of rendering the tea cream soluble in cold water at from 10° C. to 30° C.

14 Claims, No Drawings

SOLUBILIZATION OF TEA IN COLD WATER WITH CATECHIN

This is a continuation-in-part application of application Ser. No. 788,470, filed Oct. 17, 1985, now abandoned, which in turn is a continuation-in-part of application Ser. No. 732,167, filed May 8, 1985, now abandoned.

The present invention relates to a process for the production of cold soluble tea products and more particularly to the production of a powdered tea extract which is readily and completely soluble in cold water.

The traditional methods of producing instant tea, which usually consist of the steps of hot-water extraction, aroma processing, dehazing and drying, do not give cold soluble powders. For example, black tea extracts, and especially instant black tea, when made to beverage concentration become turbid if the beverage is allowed to cool to room temperature or below. This turbidity is caused by a precipitate of a complex between caffeine and polyphenols which in the trade is normally referred to as "tea cream". This tea cream which is extracted by the hot water is insoluble in cold-water and the achievement of cold-water solubility usually necessitates some additional processing of the extracted tea. This additional processing may involve simply cooling the hot aqueous tea extract to precipitate the cold-water insoluble material and discarding it, or it may involve the solubilisation of the cold-water insoluble material by chemicals or enzymes. However, in the former method, discarding all the precipitated portion results in discarding disproportionately large amounts of tea solids (up to 25%) including tannins, the black tea colour and the physiologically active principle of tea, namely, caffeine. In the latter method the reconstituted beverage is very foamy and has exceedingly poor stability, palatability and drinking properties.

Alternatively, cold-water solubility may be achieved by extracting with cold-water whereby the cold-water insoluble tea cream is not extracted. However, in using this method, several valuable components which contribute to the desirable organoleptic properties of the tea are not extracted either and the yield is very poor.

We have found, surprisingly, that by treating a hot-water extract of black tea leaves with catechins, which are natural substances extractable from plant materials containing them, the tea cream may be substantially solubilised. There is thus no need to remove the solubilised tea cream from the extract, the yield is good, and the beverage has excellent stability and organoleptic properties when reconstituted in cold-water.

Accordingly, the present invention provides a process for the production of a cold-water soluble instant tea which comprises extracting black tea leaves with hot water, concentrating and cooling the hot-water extract of black tea leaves to precipitate substantially all the tea cream characterised in that the concentrated, cooled extract of black tea leaves is treated with an appropriate quantity of a catechin or mixture of catechins capable of rendering the tea cream soluble in cold water at from 10° C. to 30° C.

The hot water extract of the black tea leaves may be prepared by any conventional method used for the hot, water extraction of black tea leaves. For example, the amount of water used for the extraction may be from 2 to 25 parts by weight, preferably from 4 to 15 parts by weight and especially from 5 to 12 parts by weight per part by weight of solid matter. The duration of the extraction is conventional, for instance up to 30 minutes, preferably from 2 to 15 minutes and especially from 5 to 12.5 minutes. The temperature of the water used for the extraction may be any temperature conventionally used for the hot extraction of tea leaves, and may be up to 130° C., for instance, from 60° C. to 125° C., preferably from 75° C. to 120° C. and especially from 85° C. to 110° C.

The extraction of the black tea leaves may be carried out batchwise or countercurrently. Batchwise extraction is preferably carried out with agitation, such as stirring, in a vessel which contains the hot water and the tea leaves, whereas in countercurrent extraction the hot-water flows countercurrently through a plurality of cells containing the tea leaves. The extract is conveniently separated from the tea leaves before treatment with the catechin. In a batchwise process this is usually carried out by filtering or centrifuging, while in a countercurrent process the separation may be achieved by drawing off the extract from the cell containing the least exhausted tea leaves.

A suitable hot-water extract of black tea leaves may be prepared by the process described in U.S. Pat. No. 3,451,823.

The concentration of the hot-water extract of black tea leaves may conveniently be carried out under vacuum, preferably to a solids content of from 5% to 12.5%, more preferably from 6% to 11% and especially from 7% to 9%. After concentration, the extract is cooled to form the cream, suitably to a temperature from 4° C. to 15° C., preferably from 7.5° C. to 12.5° C. and especially from 9° C. to 11° C. The cream is not separated from the extract.

The catechin or mixture of catechins which are used to treat the hot-water extract of black tea leaves are soluble in water and may be used as an aqueous solution. The catechins, also known as flavonoids, which are suitable for use in the process of the present invention may be obtained by extraction from plants containing them. Such plants and the catechins they contain are well known to those skilled in the art and particularly suitable plants are *Catechu gambir* (*Uncaria* family) and green tea. The catechins may be extracted from either a single plant or any mixture of plants containing them. Examples of the most common catechins which are obtained by extraction from these plants are, catechin, epicatechin, gallocatechin, epigallocatechin, epicatechingallate and epigallocatechingallate. Any mixture of two or more catechins may be used in the process of this invention. Catechin is preferably used in combination with one of the other catechins mentioned above.

Catechins are thus natural substances present in a variety of plants including some herb teas and green tea. At the present time, there is a strong desire for a completely natural cold-water soluble tea, and when the catechins used are obtained from a green tea, then the instant tea product obtained is a 100% pure cold-water soluble tea.

In this invention "green tea" includes material obtained from the tea plant *Camellia sinensis*, for instance the freshly gathered tea leaves, fresh green tea leaves that are dried immediately after gathering, fresh green tea leaves that have been heat treated before drying to inactivate their enzymes, and aqueous extracts of these leaves. It should be understood that the tea material has undergone substantially no fermentation to the black state.

An especially advantageous process for the extraction of the catechins is described and claimed in FR-A-2268518 wherein the extraction is carried out by means of a mixture of acetone and water at ambient temperature, the acetone is expelled from the solution obtained by distillation under reduced pressure, sodium chloride is added to the aqueous solution obtained until saturation to provoke the precipitation of the condensed tannins which are separated by filtration, the catechins are extracted from the aqueous solution by means of an organic solvent immiscible with the water saturated with sodium chloride, in which the catechins are soluble and without risk of denaturing them, the organic solution of catechins is dehydrated, the catechins are precipitated in adding to their organic solution a liquid miscible in all proportions with the said organic extraction solvent, but in which the aforesaid catechins are insoluble, the precipitate formed is collected and dried, characterised in that, to obtain a dehydrated organic solution of catechins, the aqueous solution of catechins, after saturation with sodium chloride and filtration, is extracted with n-butanol, the butanolic extract is evaporated to dryness under reduced pressure and the residue is recovered by a mixture of ethanol and ethyl acetate, which provides a dehydrated organic solution of catechins, and in which the liquid employed for precipitating the catechins from their organic solution in the ethanol-ethyl acetate mixture is a dehydrated ether.

However, the catechins may be extracted by any other suitable method well known to, or readily deducible by those skilled in the art, or they may be prepared by appropriate chemical methods. For example, in the case of green tea, the catechins may conveniently be obtained by extraction with cold water either batchwise or countercurrently. The temperature of the water used is generally the temperature occurring in normal circumstances in the surrounding environment, for example, from 10° C. to 40° C., more usually from 15° C. to 35° C. and especially from 20° C. to 30° C. The duration of the extraction may be from 5 minutes to 1 hour, preferably from 10 to 40 minutes and especially from 15 to 30 minutes. Longer periods of time are possible but are usually unnecessary. The amount of water used for the cold extraction may be from 2 to 50 parts by weight, conveniently from 4 to 30 parts by weight and preferably from 5 to 25 parts by weight per part by weight of green tea. The water used is advantageously deionised water. After extraction, the cold extract containing the catechins is separated from the green tea, for example, by filtration or centrifugation. If desired, the spent leaves from the cold water extract may be extracted again by a conventional hot water extraction either batchwise or countercurrently as for the black tea leaves to obtain further catechins which may optionally be added to the cold-water extract of green tea/infusion of black tea mixture.

Advantageously, before being used to treat the hot-water extract of black tea leaves, the aqueous extract of the green tea, preferably the cold-water extract, is treated with a salt of a strong acidic cationic exchange resin such as a polystyrene, nuclear sulphonic acid sold under the Trade Names AMBERLITE 120-IR and DUOLITE C-20, styrene divinyl benzene copolymers with functional sulphonic acid groups sold under the Trade Name DOWEX-50, or resins having a phenolic matrix with methylene sulphonic acid functional groups sold under the Trade Name DUOLITE C-3 and DUOLITE C-10. The salt may be the potassium salt but it is preferably the sodium salt. Conveniently, a column is filled with the resin and the tea extract passed through, preferably upflow to avoid channelling. The amount of resin is suitably from 30 to 70% and preferably from 40 to 60% by weight based on the weight of dry green tea leaves.

The treatment of the aqueous extract of the green tea with a salt of a strong acidic cationic exchange resin helps to improve the clarity of a slution of the resultant powdered black tea extract after treatment in accordance with the present invention.

Preferably, the minimum amount of the catechin is the amount required to solubilise substantially all the tea cream present. The quantity of tea cream present in a hot-water extract of tea leaves may be determined gravimetrically by calculating the cream index (CI) as follows:

$$CI = \frac{A - B}{A} \times 100$$

wherein
A = yield (soluble solids) of the infusion, and
B = yield (soluble solids) of the supernatant after having separated the tea cream.

The quantity of catechin required to solubilise the tea cream is generally from 1.25 to 2.0 parts and preferably from 1.5 to 1.7 parts of solid per part by weight of tea cream. If insufficient catechin were used, then the tea cream would not be completely solubilised and the insoluble remainder would need to be removed to obtain a cold-water soluble tea. Although a quantity of catechin greater than that required to solubilise the tea cream could be used, there is no advantage in doing so and it would be wasteful.

When green tea is used as the source of catechins, the amount of green tea leaves required to produce the appropriate quantity of catechins is from 2.5 to 5 parts and preferably three to four parts by weight per part by weight of black tea. It is possible to use more, but unnecessary.

Catechins are preferably added in the form of an aqueous solution. The concentration of the aqueus solution of catechin is not critical and the solution used may simply contain sufficient water to dissolve the catechin; however, the solution preferably has a solids content of from 10% to 30% and especially from 15% to 25%.

The temperature of the hot-water extract, when it is used in liquid form for the treatment with the catechin, is not critical and may vary from substantially normal ambient temperature to a temperature of about 4° C. to which the extract may be cooled to precipitate the tea cream. The catechin which is used to treat the hot-water extract is most conveniently employed at ambient temperature.

The duration of the treatment of the hot-water extract used in liquid form with the catechin is not critical. The solubilisation of the tea cream with the catechin is achieved almost instantaneously but, advantageously, the treatment is carried out for a period up to 20 minutes and preferably from 5 to 15 minutes, conveniently by allowing the mixture to stand. The mixture may be agitated if desired, for instance, by stirring but this is usually unnecessary. After the treatment, the mixture is usually concentrated and dried, for instance, by spray-drying or freeze-drying.

The present invention is applicable to all kinds of black teas and their blends, and the reconstituted beverage has excellent taste.

The following examples further illustrate the present invention.

EXAMPLE 1

30 g of black tea leaves were extracted for 15 minutes with 300 g water which had been brought to the boiling point. The spent leaves were separated by centrifugation, and the clear extract was concentrated under vacuum to a solids content of 8% and then cooled down to 10° C. to precipitate the tea cream.

An extract of green tea was prepared by following essentially the procedure described in Example 1 of FR-A-2268518. 100 g of green tea leaves are macerated with 500 ml of a mixture consisting of 200 ml acetone and 300 ml water at ambient temperature. The mixture is left in contact for several hours after passage through the grinder and then filtered. The extracted tea leaves are then taken up in 125 ml of a similar mixture containing 2 parts acetone and 3 parts water and extracted by leaching. After filtration and combination of the filtrates, most of the acetone is expelled by distillation under reduced pressure. Sodium chloride is added to the aqueous solution obtained until saturation and after several hours the solution is filtered. The filtrate is then extracted six times with 50 ml portions of n-butanol and the butanolic extract is evaporated to dryness under reduced pressure. The residue is taken up by 100 ml of a mixture containing equal proportions of ethanol and ethyl acetate with cooling, if necessary.

The catechins are precipitated by the addition of four parts by volume of dehydrated ethyl ether per part by volume of the solution of catechins. The precipitate is filtered off, washed with a little ether and dried in the drying cupboard at 60° C. to give 10 g of a powder.

The powder obtained was dissolved in 50 g water to give a solution having a solids content of 20%. This aqueous solution was added to the black tea extract and allowed to stand for 10 minutes after which the mixture was further concentrated and spray-dried. The instant tea produced was thus 100% pure, was completely soluble and had an excellent taste when reconstituted as a beverage by adding to water at 10° C.

EXAMPLE 2

By following a similar procedure to that described in Example 1 but using an extract of *Catechu gambir* as the catechin source, an instant tea was produced which was completely soluble and had an excelllent taste when reconstituted as a beverage by adding to water at 10° C.

EXAMPLE 3

30 g of black tea leaves were extracted for 15 minutes with 300 g water which had been brought to the boiling point. The spent leaves were separated by centrifugation.

100 g of green tea leaves were extracted for 30 minutes with 500 g of cold deionised water at 25° C. with stirring. The spent leaves were separated by centrifugation, and the cold extract was passed upwards through a column containing 25 g AMBERLITE 120-IR cationic exchange resin (the sodium salt of a polystyrene nuclear sulphonic acid manufactured by Rohm and Haas). This treated cold extract of green tea leaves was added to the black tea extract and allowed to stand for 10 minutes after which the mixture was concentrated and spray-dried. The instant tea produced was completely soluble in cold water at 10° C. giving a beverage with an excellent taste.

COMPARATIVE EXAMPLE A

By following a similar procedure to that described in Example 1 but using only 60 g of green tea leaves instead of 100 g, the amount of powder obtained was only 6 g. This amount of powder was insufficient to dissolve the tea cream produced by 30 g of black tea and the tea was found to be turbid at temperature between 10° C. and 30° C.

COMPARATIVE EXAMPLE B

By following a similar procedure to that described in Example 3 but using only 60 g of green tea leaves, the instant tea produced was turbid at 10° C.

We claim:

1. A process which comprises treating an extract of black tea containing tea cream with at least one catechin compound in an amount effective to render the tea cream in the extract soluble in cold water at a temperature of from 10° C. to 30° C.

2. A process according to claim 1 wherein the extract has a solids content of from 6% to 11% and is cooled to a temperature of from 7.5° C. to 12.5° C. before being treated.

3. A process according to claim 1 wherein the at least one catechin compound is selected from the group consisting of catechin, epicatechin, gollocatechin, epigallocatechin, epicatechingallate and epigallocatechingallate and combinations thereof.

4. A process according to claim 1 wherein the extract is treated with 1.25 to 2 parts by weight of solids of at least one catechin compound per part by weight of tea cream present in the extract.

5. A process according to claim 4 wherein the extract is treated with 1.5 to 1.7 parts by weight of at least one catechin compound per part by weight of tea cream present in the extract.

6. A process according to claim 1 wherein the at least one catechin compound is in an aqueous solution having a solids content of from 10% to 30%.

7. A process according to claim 1 wherein the at least one catechin compound is obtained by extracting green tea leaves to obtain an extract.

8. A process according to claim 7 wherein the at least one catechin is obtained by treating the green tea extract with a salt of a strong acidic cationic exchange resin.

9. A process according to claim 8 wherein the salt is selected from the group consisting of a potassium salt and a sodium salt.

10. A process according to claim 8 wherein the amount of resin used to treat the green tea extract is from 30% to 70% by weight based on the weight of dry green tea leaves used to obtain the green tea extract.

11. A process according to claim 10 wherein the amount of resin is from 40% to 60% by weight based upon the weight of the dry green tea leaves used to obtain the green tea extract.

12. A process according to claim 8 wherein the green tea extract is a cold-water extract of green tea.

13. A process according to claim 7 wherein the at least one catechin is obtained by extracting the green tea extract.

14. A process according to claim 1 wherein the at least one catechin compound is obtained from *Catechu grambir*.

* * * * *